(No Model.)
R. T. MOSS.
HORSE TAIL HOLDER.
No. 336,254. Patented Feb. 16, 1886.
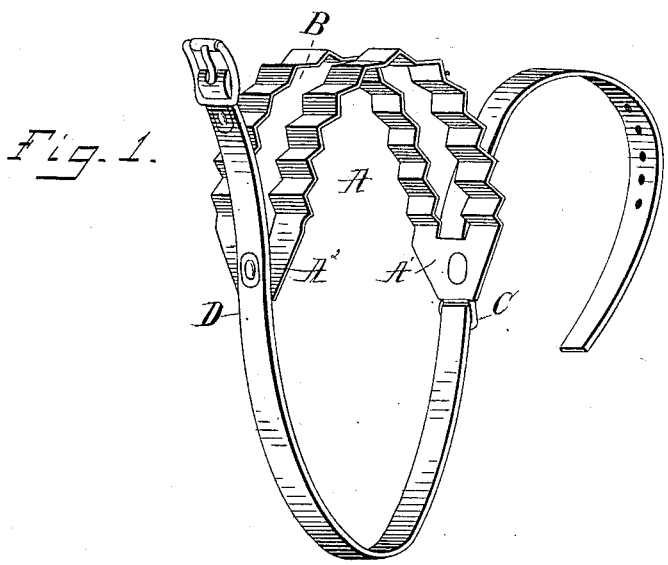
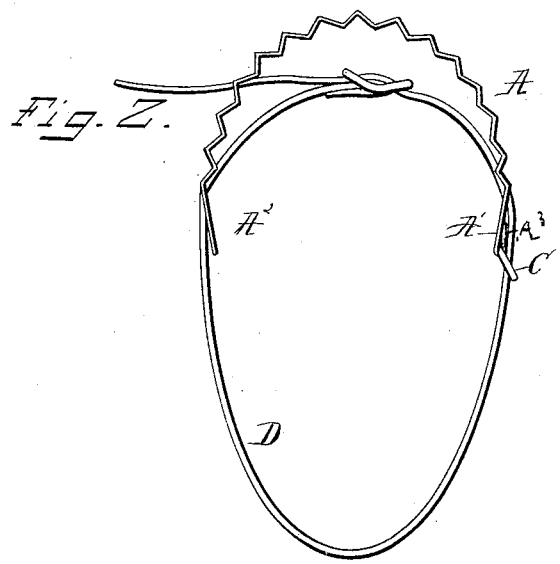

UNITED STATES PATENT OFFICE.

ROBERT T. MOSS, OF CAMBRIDGE, OHIO, ASSIGNOR OF ONE-HALF TO W. L. HALLER, OF BUFFALO, NEW YORK.

HORSE-TAIL HOLDER.

SPECIFICATION forming part of Letters Patent No. 336,254, dated February 16, 1886.

Application filed June 12, 1885. Serial No. 168,507. (No model.)

*To all whom it may concern:*

Be it known that I, ROBERT T. MOSS, a citizen of the United States, residing at Cambridge, in the county of Guernsey and State of Ohio, have invented certain new and useful Improvements in Horse-Tail Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to certain improvements in horse-tail holders, and has for its object to provide a simple and efficient device for holding horses' tails out of the mud, dirt, &c.

It consists in certain novel features of construction, hereinafter fully described, and specifically pointed out in the claims.

In the drawings hereto annexed, Figure 1 is a perspective of my device, the retaining-strap being shown as unfastened. Fig. 2 is an elevation showing the retaining-strap as fastened.

My device is composed of a curved metal plate, A, bent to fit around the horse's tail, as shown. This plate A is preferably corrugated through nearly its entire length. The corrugations prevent the holder from slipping off the horse's tail, as will presently appear. A slot, B, runs nearly the entire length of the plate A, as shown in Fig. 1. The retaining-strap passes through this slot, as shown in Fig. 2, in the operation of my device. The ends A' A² of the plate A are made smooth, as shown. The end A' is provided with an elongation, A³, which is inserted through a loop or keeper, C, and then bent back upon itself and riveted to the end A' of the plate A, thus securing the loop or keeper C. The retaining-strap D is secured near its buckle end A² of the plate A, as shown. The strap D is inserted through the loop or keeper C and slides easily therein in the operation of the device.

In use, after the horse's tail has been folded, it is placed through my device between the retaining-strap and the metal plate, as will be understood. The strap is then fastened and tightened, as will be readily understood from the drawings. As the strap is tightened it will pass through the slot B. This will cause the hair of the tail of the horse to bulge just above and below the strap and bind against the corrugated surface of the plate, thereby preventing the plate slipping down and off the tail, and prevents the holder from turning around or revolving on the tail. In practice the edges of the plate will be rounded, so as not to cut the hair of the horse's tail.

The corrugated plate may be formed of any of the metals, according to the taste of the user. It is simple in construction and efficient in operation.

The strap D could have one end only secured to the curved plate, or, if desired, the strap and plate could be wholly detached. In this last construction I would provide loops at both ends of the plate, through which to slip the strap.

Having thus described my invention, what I claim, and desire to secure by Letters Patent, is—

1. A horse-tail holder consisting of the following elements in combination: a plate longitudinally slotted to within a short distance of each end, a strap connected with one of said ends and loosely passed through a keeper or loop carried by the other end, said strap being adapted to pass within said slot, substantially as and for the purposes specified.

2. The hereinbefore-described horse-tail holder, consisting of a curved metal plate provided with a longitudinal slot and having one end provided with an extension bent upon itself, a loop or keeper held by the bent extension, and a retaining-strap passed through the loop or keeper and secured to the opposite ends of the plate, substantially as shown, and for the purposes set forth.

In testimony whereof I affix my signature in presence of two witnesses.

ROBERT T. MOSS.

Witnesses:
JOHN T. RAINEY,
M. E. GALLUP.